United States Patent
Zhao et al.

(10) Patent No.: US 10,652,074 B2
(45) Date of Patent: May 12, 2020

(54) IEEE802.11P PROTOCOL BASED VEHICLE-TO-ROADSIDE AND VEHICLE-TO-VEHICLE COMMUNICATION TEST METHODS ORIENTED TO THE INTERNET OF VEHICLES

(71) Applicant: Chang'an University, Xi'an, Shaanxi (CN)

(72) Inventors: Xiangmo Zhao, Shaanxi (CN); Runmin Wang, Shaanxi (CN); Zhigang Xu, Shaanxi (CN); Xiaofeng Deng, Shaanxi (CN); Yu Zhu, Shaanxi (CN); Zhanwen Liu, Shaanxi (CN); Dongwu Li, Shaanxi (CN); Pengpeng Sun, Shaanxi (CN); Ting Chen, Shaanxi (CN); Lan Yang, Shaanxi (CN)

(73) Assignee: Chang'an University, Xi'an (CN)

( * ) Notice: Subject to any disclaimer, the term of this patent is extended or adjusted under 35 U.S.C. 154(b) by 0 days.

(21) Appl. No.: 16/226,037

(22) Filed: Dec. 19, 2018

(65) Prior Publication Data

US 2019/0207800 A1 Jul. 4, 2019

(30) Foreign Application Priority Data

Dec. 28, 2017 (CN) .......................... 2017 1 1463471

(51) Int. Cl.
*H04L 29/06* (2006.01)
*H04L 12/26* (2006.01)
(Continued)

(52) U.S. Cl.
CPC ....... *H04L 29/06006* (2013.01); *B60W 50/00* (2013.01); *H04L 43/0864* (2013.01);
(Continued)

(58) Field of Classification Search
CPC .......... H04L 29/06006; H04L 43/0864; H04L 43/0888; H04L 67/12; H04W 4/46; H04W 4/44; B60W 50/00; G06F 17/11
See application file for complete search history.

(56) References Cited

U.S. PATENT DOCUMENTS

2017/0178498 A1\* 6/2017 Mcerlean ............... B60K 35/00
2017/0332208 A1\* 11/2017 Cardoso de Moura ......................
                                                        H04W 4/06
2018/0302770 A1\* 10/2018 Bhaskaran .............. H04W 4/40

FOREIGN PATENT DOCUMENTS

CN       103825972 A       5/2014
CN       104867350 A       8/2015
(Continued)

*Primary Examiner* — Duc C Ho
(74) *Attorney, Agent, or Firm* — Wayne & Ken, LLC; Tony Hom

(57) ABSTRACT

An IEEE 802.11p protocol-based vehicle-to-roadside and vehicle-to-vehicle communication test method oriented to the Internet of Vehicles. The method includes: driving a host vehicle and a target vehicle at a same speed on a road segment; the host vehicle being located behind the target vehicle; a constant distance is maintained between the host vehicle and the target vehicle; the host vehicle is equipped with a host vehicular communication unit, the target vehicle is equipped with a target vehicular communication unit communicating with the host vehicular communication unit; calculating a throughput and a round trip time RTT from the target vehicular communication unit to the host vehicular communication unit; repeating driving the host vehicle and target vehicle N times, and calculating an average throughput and an average round trip time (RTT) of the N times; and calculating a network performance parameter η according to the average throughput and the RTT.

8 Claims, 4 Drawing Sheets

(51) Int. Cl.
    *H04W 4/46*          (2018.01)
    *B60W 50/00*        (2006.01)
    *G06F 17/11*           (2006.01)
    *H04W 4/44*           (2018.01)
    *H04L 29/08*          (2006.01)

(52) U.S. Cl.
    CPC ............ *H04L 43/0888* (2013.01); *H04W 4/46*
        (2018.02); *G06F 17/11* (2013.01); *H04L 67/12*
                 (2013.01); *H04W 4/44* (2018.02)

(56) References Cited

FOREIGN PATENT DOCUMENTS

| | | |
|---|---|---|
| CN | 105490715 A | 4/2016 |
| CN | 205545291 U | 8/2016 |
| CN | 103634161 B | 5/2017 |
| CN | 106961366 A | 7/2017 |

\* cited by examiner

IEEE802.11P PROTOCOL BASED VEHICLE-TO-ROADSIDE AND VEHICLE-TO-VEHICLE COMMUNICATION TEST METHODS ORIENTED TO THE INTERNET OF VEHICLES

CROSS-REFERENCE TO RELATED APPLICATIONS

This application claims priority from Chinese Patent Application No. CN201711463471.6, filed on Dec. 28, 2017, which is hereby incorporated by reference in its entirety.

TECHNICAL FIELD

The present invention relates to the field of network communications technologies, and in particular, to IEEE 802.11p protocol-based vehicle-to-roadside and vehicle-to-vehicle communication test methods oriented to the Internet of Vehicles.

BACKGROUND

In an Internet of Vehicles environment, to implement intelligent perception of transport environment information, floating vehicle running data needs to be collected in real time and background analysis processing needs to be performed. In this background, the IEEE 802.11p protocol emerges. The IEEE 802.11p protocol is a communications protocol extended from the IEEE 802.11 standard, and is mainly used in a vehicular communications system. The protocol complies with a requirement of a related application of an intelligent transport system. The application includes data exchange between vehicles running at high speeds and between a vehicle and a roadside infrastructure. In comparison with other mainstream wireless communications technologies, the IEEE 802.11p protocol has features of self-organization, a low transmission delay, a long transmission distance, and a high transmission rate. The features determine that the IEEE 802.11p protocol is applicable to communication applications of information transmission in a range of a transport environment and delay-sensitive transport security applications. In addition, in a transport communication environment, a vehicular mobile network needs to solve a problem of ensuring a low information delay and a high transmission rate when a terminal is in a high-speed moving state. In most broadband wireless access modes, a Doppler frequency shift is generated due to high-speed moving of a terminal, causing severe deterioration of network performance. In the IEEE 802.11p protocol, a duration of a guard interval is increased at a physical layer to greatly improve network performance in the high-speed moving state. In comparison with 4G-LTE in which performance in the high-speed moving state is obviously affected and a handover delay of a BSS in an 802.11 wireless local area network is generally too high, in current research, it is considered that the IEEE 802.11p protocol is a wireless network mode most suitable for bearing transport security applications. Currently, an existing test mode for the IEEE 802.11p protocol mainly includes using network simulation software or a wireless network test bed. Existing network simulation software generally makes a lot of simplifications and assumptions on parameters or models, such as a network channel, a topology, and traffic, and hardly reflects real features and conditions of the IEEE 802.11p protocol truthfully. An existing wireless network test bed can perform a performance test only on a to-be-tested node that is deployed statically, and when vehicular communications nodes move at high speeds relative to each other or a vehicular communications node moves at a high speed relative to a roadside communications node, a severe Doppler frequency shift is generated, and consequently a large deviation exists between a test result and actual system performance.

Therefore, the existing network simulation software and wireless network test bed cannot perform an effective test on an IEEE 802.11p protocol-based wireless network system of the Internet of Vehicles including a to-be-tested node that moves at a high speed.

SUMMARY

In view of disadvantages of the prior art, the present invention provides IEEE 802.11p protocol-based vehicle-to-roadside and vehicle-to-vehicle communication test methods oriented to the Internet of Vehicles to solve a problem in the prior art that an effective test cannot be performed on an IEEE 802.11p protocol-based wireless network system of the Internet of Vehicles including a to-be-tested node that moves at a high speed.

To solve the foregoing technical problem, the present invention uses the following technical solutions for implementation:

An IEEE 802.11p protocol-based vehicle-to-vehicle communication test method oriented to the Internet of Vehicles includes the following steps:

step 1: randomly selecting two vehicles, where one vehicle is a host vehicle, the other vehicle is a target vehicle, the host vehicle and the target vehicle are driven at a same speed per hour on a road segment L, the host vehicle is located behind the target vehicle, a constant distance is maintained between the host vehicle and the target vehicle, the host vehicle is equipped with a host vehicular communication unit, the target vehicle is equipped with a target vehicular communication unit, and the host vehicular communication unit and the target vehicular communication unit are capable of communicating with each other using the vehicular communication units;

step 2: calculating a throughput and a round trip time RTT from the target vehicular communication unit to the host vehicular communication unit;

step 3: driving the host vehicle and the target vehicle on the road segment L for N times, and calculating an average throughput and an average round trip time RTT of the N times; and step 4: calculating a network performance parameter η using an equation (1) according to the average throughput (AT) and the average round trip time RTT that are obtained through calculation in the foregoing step:

$$\eta = \frac{AT}{800 \text{ KBps}} \times 0.35 + \frac{10 \text{ ms}}{RTT} \times 0.65; \quad (1)$$

and if η≥0.9, considering that IEEE 802.11p protocol-based wireless network performance of the Internet of Vehicles is excellent;

if 0.75≤η<0.9, considering that IEEE 802.11p protocol-based wireless network performance of the Internet of Vehicles is good;

if 0.6≤η<0.75, considering that IEEE 802.11p protocol-based wireless network performance of the Internet of Vehicles is moderate; or if θ<0.6, considering that IEEE 802.11p protocol-based wireless network performance of the Internet of Vehicles is poor.

Further, calculating an average throughput from the target vehicular communication unit to the host vehicular communication unit includes:

step 21: sending, by the host vehicular communication unit, a throughput test request data packet to the target vehicular communication unit, and starting a timer with 1 s as a period;

step 22: after receiving the throughput test request data packet, returning, by the target vehicular communication unit, a UDP data packet continuously, and persisting for 4 s, where the UDP data packet includes a location of the target vehicle and driving status information; and step 23: recording, by the host vehicular communication unit, UDP data packets received in every 1 s period, persisting for three periods, and calculating a throughput of a unidirectional link from the target vehicular communication unit to the host vehicular communication unit according to a quantity of bytes of UDP data packets received in a second period.

Further, calculating a round trip time RTT from the target vehicular communication unit to the host vehicular communication unit includes:

step 24: sending, by the host vehicular communication unit, an ICMPv6 data packet to the target vehicular communication unit at an interval of 0.1 s cyclically, persisting for 3 s, and recording a sending time sequence T_Send[i] of sending the ICMPv6 data packet, where i=1, 2, . . . , 30;

step 25: after receiving the ICMPv6 data packet, returning, by the target vehicular communication unit, an ICMPv6 response data packet;

step 26: recording, by the host vehicular communication unit, a receiving time sequence T_Receive[j] of receiving the ICMPv6 response data packet from the target vehicular communication unit, where j=1, 2, . . . , 30; and step 27: when the response data packet is unreachable or times out, setting the corresponding sending time sequence T_Send[i] and the receiving time sequence T_Receive[j] to 0, where i=j, increasing a failure count (FC) by 1, and calculating the round trip time RTT according to an equation (3), where $$RTT = \frac{\sum_{i=j=1}^{30}(T\_Receive[j] - T\_Send[i])}{30 - FC}. \quad (3)$$

Further, the road segment L is a ring road segment.

The present invention further provides an IEEE 802.11p protocol-based vehicle-to-roadside communication test method oriented to the Internet of Vehicles, where the method includes the following steps:

step 1: randomly selecting a vehicle as a target vehicle, and driving the target vehicle on a road segment L, where a roadside communication unit is disposed near the road segment L, the target vehicle is equipped with a target vehicular communication unit, and the roadside communication unit and the target vehicular communication unit are capable of communicating with each other using a vehicular communication unit;

step 2: calculating a throughput and a round trip time RTT from the target vehicular communication unit to the roadside communication unit; and step 3: driving the target vehicle on the road segment L for N times, and calculating an average throughput and an average round trip time RTT of the N times;

step 4: calculating a network performance parameter η using an equation (1) according to the average throughput and the average round trip time RTT that are obtained through calculation in the foregoing step:

$$\eta = \frac{AT}{800 \text{ KBps}} \times 0.35 + \frac{10 \text{ ms}}{RTT} \times 0.65; \quad (1)$$

and if η≥0.9, considering that IEEE 802.11p protocol-based wireless network performance of the Internet of Vehicles is excellent;

if 0.75≤η<0.9, considering that IEEE 802.11p protocol-based wireless network performance of the Internet of Vehicles is good;

if 0.6≤η<0.75, considering that IEEE 802.11p protocol-based wireless network performance of the Internet of Vehicles is moderate; or if η<0.6, considering that IEEE 802.11p protocol-based wireless network performance of the Internet of Vehicles is poor.

Further, calculating an average throughput from the target vehicular communication unit to the roadside communication unit includes:

step 21: sending, by the roadside communication unit, a throughput test request data packet to the target vehicular communication unit, and starting a timer with 1 s as a period;

step 22: after receiving the throughput test request data packet, returning, by the target vehicular communication unit, a UDP data packet continuously, and persisting for 4 s, where the UDP data packet includes a location of the target vehicle and driving status information; and step 23: recording, by the roadside communication unit, UDP data packets received in every 1 s period, persisting for three periods, and calculating a throughput of a unidirectional link from the target vehicular communication unit to the roadside communication unit according to a quantity of bytes of UDP data packets received in a second period.

Further, calculating a round trip time RTT from the target vehicular communication unit to the roadside communication unit includes:

step 24: sending, by the roadside communication unit, an ICMPv6 data packet to the target vehicular communication unit at an interval of 0.1 s cyclically, persisting for 3 s, and recording a sending time sequence T_Send[i] of sending the ICMPv6 data packet, where i=1, 2, . . . , 30;

step 25: after receiving the ICMPv6 data packet, returning, by the target vehicular communication unit, an ICMPv6 response data packet;

step 26: recording, by the roadside communication unit, a receiving time sequence T_Receive[j] of receiving the ICMPv6 response data packet from the target vehicular communication unit, where j=1, 2, . . . , 30; and step 27: when the response data packet is unreachable or times out, setting the corresponding sending time sequence T_Send[i] and the receiving time sequence T_Receive[j] to 0, where i=j, increasing a failure count by 1, and calculating the round trip time RTT according to an equation (3), where $$RTT = \frac{\sum_{i=j=1}^{30}(T\_Receive[j] - T\_Send[i])}{30 - FC}. \quad (3)$$

Further, the road segment L is a straight road segment.

In comparison with the prior art, the present invention has the following technical effects:

(1) When an actual application of vehicle-to-vehicle or vehicle-to-roadside communication requires a low throughput and a high delay, a small weight is assigned to a throughput, and a large weight is assigned to a round trip time RTT according to the present invention; however, in the prior art, network performance evaluation is usually performed based on one factor such as a throughput or a round trip time or by treating two factors equally. Therefore, factors considered in the present invention are more comprehensive and effective, and accuracy of network performance evaluation is higher.

(2) At a physical layer of the IEEE 802.11p protocol used in the present invention, a duration of a guard interval is increased to greatly improve network performance in a high-speed moving state. In comparison with 4G-LTE in which performance is obviously affected in a high-speed moving state and a handover delay of a BSS in an 802.11 wireless local area network is generally too high, the present invention has features of a low transmission delay, a long transmission distance, and a high transmission rate, and significantly improves accuracy of network performance evaluation.

(3) The two influencing factors throughput and round trip time RTT used to evaluate network performance in the present invention are both processed twice. This effectively avoids an unstable sample value and an invalid value in a test process, so that accuracy of network performance evaluation is higher.

Specific content of the present invention is hereinafter described in detail with reference to accompanying drawings.

DETAILED DESCRIPTION OF EMBODIMENTS

The following provides specific embodiments of the present invention. It should be noted that the present invention is not limited to the following specific embodiments. Any equivalent change made on a basis of the technical solutions of this application shall fall within the protection scope of the present invention.

Embodiment 1

Figure 1:
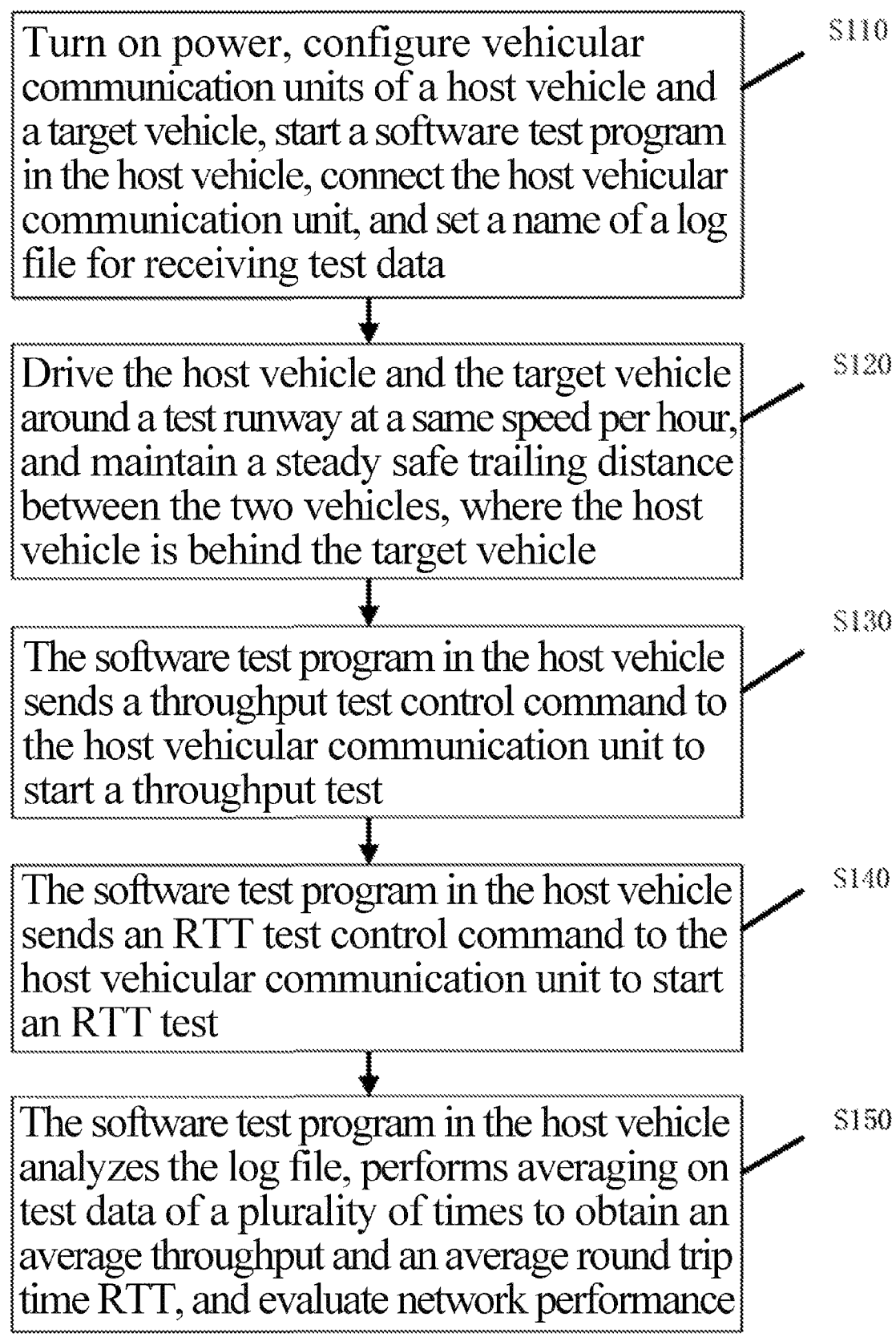
FIG. 1 is a flowchart of an IEEE 802.11p protocol-based vehicle-to-vehicle communication test method oriented to the Internet of Vehicles according to the present invention.

Complying with the foregoing technical solutions, as shown in FIG. 1, this embodiment provides an IEEE 802.11p protocol-based vehicle-to-vehicle communication test method oriented to the Internet of Vehicles, where the method includes the following steps:

Step 1: Randomly select two vehicles, where one vehicle is a host vehicle, the other vehicle is a target vehicle, the host vehicle and the target vehicle are driven at a same speed per hour on a road segment L, the host vehicle is located behind the target vehicle, a constant distance is maintained between the host vehicle and the target vehicle, the host vehicle is equipped with a host vehicular communication unit, the target vehicle is equipped with a target vehicular communication unit, and the host vehicular communication unit and the target vehicular communication unit are capable of communicating with each other using the vehicular communication units.

Step 2: Calculate a throughput and a round trip time RTT from the target vehicular communication unit to the host vehicular communication unit.

Step 3: Drive the host vehicle and the target vehicle on the road segment L for N times, and calculate an average throughput and an average round trip time RTT of the N times.

The road segment L in this embodiment is a ring road segment. The host vehicle and the target vehicle are driven on a ring road segment around a circle. In this embodiment, a quantity N of traveled circles is set to 5.

Step 4: Calculate a network performance parameter η using an equation (1) according to the average throughput and the average round trip time RTT that are obtained through calculation in the foregoing step:

$$\eta = \frac{AT}{800 \text{ KBps}} \times 0.35 + \frac{10 \text{ ms}}{RTT} \times 0.65; \quad (1)$$

and if η≥0.9, consider that IEEE 802.11p protocol-based wireless network performance of the Internet of Vehicles is excellent;

if 0.75≤η<0.9, consider that IEEE 802.11p protocol-based wireless network performance of the Internet of Vehicles is good;

if 0.6≤η<0.75, consider that IEEE 802.11p protocol-based wireless network performance of the Internet of Vehicles is moderate; or if η<0.6, consider that IEEE 802.11p protocol-based wireless network performance of the Internet of Vehicles is poor.

In this embodiment, the throughput and the round trip time RTT are calculated using a software test program. The software test program is arranged in a Windows10 notebook computer in the host vehicle, and is configured to control a throughput test and a round trip time RTT (Round-Trip Time) test of the host vehicular communication unit, and store data sent by the host vehicular communication unit through an Ethernet communication module into a log file; and then analyze the log file, perform averaging on test data of a plurality of times to obtain the average throughput and the average round trip time RTT, and evaluate network performance.

In this embodiment, a power inverter is further disposed, and is configured to convert a 12 V vehicular DC direct current into a 220 V AC alternating current same as a mains supply, and supply power to the vehicular communication units of the host vehicle and the target vehicle, to ensure transmit frequencies of the vehicular communication units, increase a signal-to-noise ratio, and reduce a bit error rate.

Figure 3:
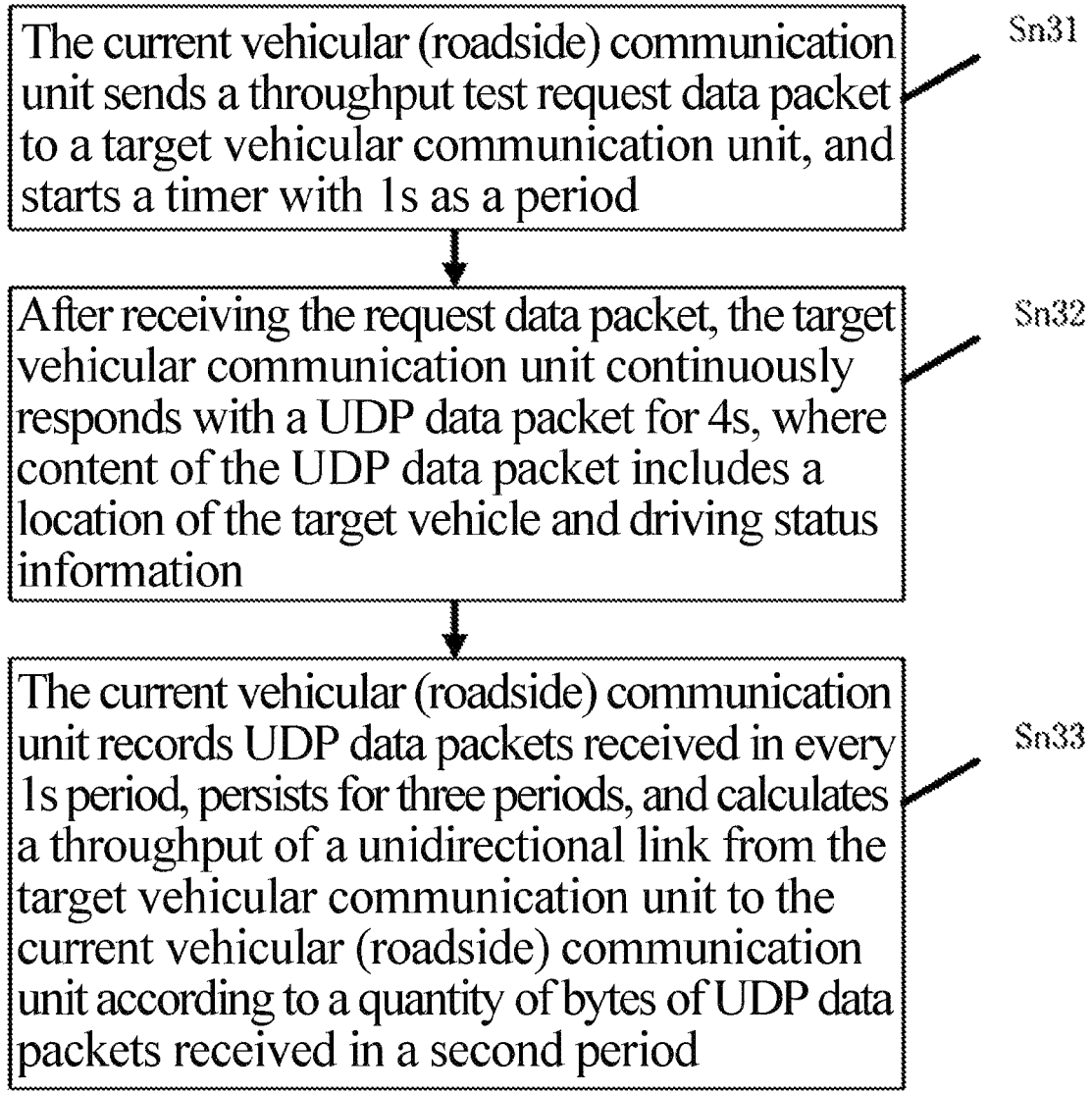
FIG. 3 is a flowchart of a throughput test according to the present invention.

As shown in FIG. 3, calculating an average throughput from the target vehicular communication unit to the host vehicular communication unit includes the following steps:

Step 21: The host vehicular communication unit sends a throughput test request data packet to the target vehicular communication unit, and starts a timer with 1 s as a period.

Step 22: After receiving the throughput test request data packet, the target vehicular communication unit returns a UDP data packet continuously, and persists for 4 s, where the UDP data packet includes a location of the target vehicle and driving status information.

Step 23: The host vehicular communication unit records UDP data packets received in every 1 s period, persists for three periods, and calculates a throughput of a unidirectional link from the target vehicular communication unit to the host vehicular communication unit according to a quantity of bytes of UDP data packets received in a second period.

Figure 4:
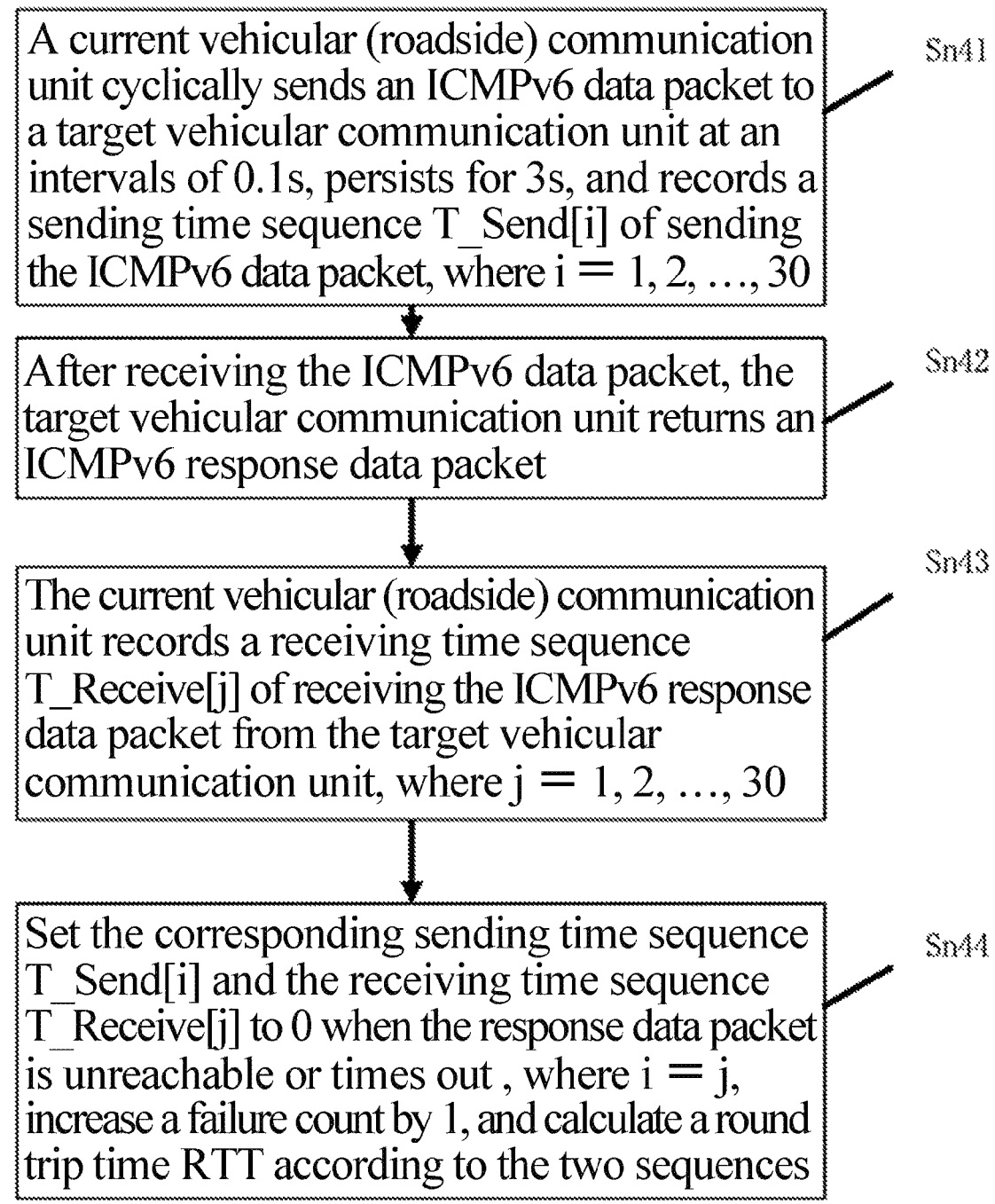
FIG. 4 is a flowchart of a round trip time RTT test according to the present invention.

As shown in FIG. 4, calculating a round trip time RTT from the target vehicular communication unit to the host vehicular communication unit includes the following steps:

Step 24: The host vehicular communication unit sends an ICMPv6 data packet to the target vehicular communication unit at an interval of 0.1 s cyclically, persists for 3 s, and records a sending time sequence T_Send[i] of sending the ICMPv6 data packet, where i=1, 2, . . . , 30.

Step 25: After receiving the ICMPv6 data packet, the target vehicular communication unit returns an ICMPv6 response data packet.

Step 26: The host vehicular communication unit records a receiving time sequence T_Receive[j] of receiving the ICMPv6 response data packet from the target vehicular communication unit, where j=1, 2, . . . , 30.

Step 27: When the response data packet is unreachable or times out, set the corresponding sending time sequence T_Send[i] and the receiving time sequence T_Receive[j] to 0, where i=j, increase a failure count by 1, and calculate the round trip time RTT according to an equation (3), where $$RTT = \frac{\sum_{i=j=1}^{30} (T\_Receive[j] - T\_Send[i])}{30 - FC}. \quad (3)$$

Embodiment 2

Figure 2:
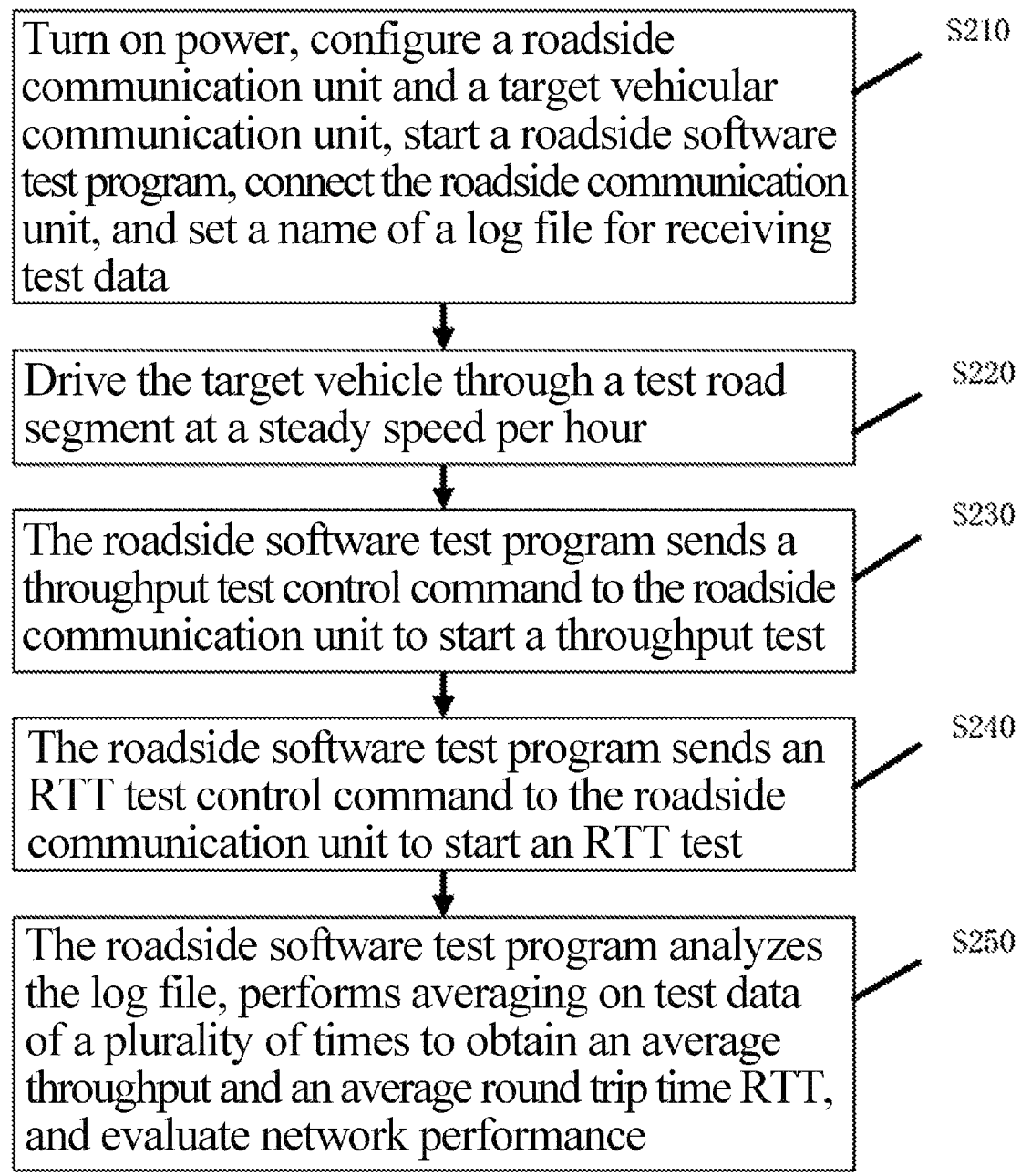
FIG. 2 is a flowchart of an IEEE 802.11p protocol-based vehicle-to-roadside communication test method oriented to the Internet of Vehicles according to the present invention.

This embodiment further provides an IEEE 802.11p protocol-based vehicle-to-roadside communication test method oriented to the Internet of Vehicles, as shown in FIG. 2, where the method includes the following steps:

Step 1: Randomly select a vehicle as a target vehicle, and drive the target vehicle on a road segment L, where a roadside communication unit is disposed near the road segment L, the target vehicle is equipped with a target vehicular communication unit, and the roadside communication unit and the target vehicular communication unit are capable of communicating with each other using a vehicular communication unit.

Step 2: Calculate a throughput and a round trip time RTT from the target vehicular communication unit to the roadside communication unit.

Step 3: Drive the target vehicle on the road segment L for N times, and calculate an average throughput and an average round trip time RTT of the N times.

The road segment L in this embodiment is a straight road segment. The target vehicle is driven back and forth on the straight road segment. A quantity of times of driving back and forth is set to 5 in this embodiment.

Step 4: Calculate a network performance parameter η using an equation (1) according to the average throughput and the average round trip time RTT that are obtained through calculation in the foregoing step:

$$\eta = \frac{AT}{800 \text{ KBps}} \times 0.35 + \frac{10 \text{ ms}}{RTT} \times 0.65; \quad (1)$$

and if η≥0.9, consider that IEEE 802.11p protocol-based wireless network performance of the Internet of Vehicles is excellent;

if 0.75≤η<0.9, consider that IEEE 802.11p protocol-based wireless network performance of the Internet of Vehicles is good;

if 0.6≤η<0.75, consider that IEEE 802.11p protocol-based wireless network performance of the Internet of Vehicles is moderate; or if η<0.6, consider that IEEE 802.11p protocol-based wireless network performance of the Internet of Vehicles is poor.

In this embodiment, the throughput and the round trip time RTT are calculated using a software test program. The software test program is arranged in a roadside Windows10 notebook computer, and is configured to control a throughput test and a round trip time RTT (Round-Trip Time) test of the roadside communication unit, and store data sent by the roadside communication unit through an Ethernet communication module into a log file; and then analyze the log file, perform averaging on test data of a plurality of times to obtain the average throughput and the average round trip time RTT, and evaluate network performance.

In this embodiment, a power inverter is further disposed, and is configured to convert a 12 V vehicular DC direct current into a 220 V AC alternating current same as a mains supply, and supply power to the vehicular communication unit of the target vehicle, to ensure transmit frequencies of the vehicular communication unit, increase a signal-to-noise ratio, and reduce a bit error rate.

Calculating an average throughput from the target vehicular communication unit to the roadside communication unit includes the following steps:

Step 21: The roadside communication unit sends a throughput test request data packet to the target vehicular communication unit, and starts a timer with 1 s as a period.

Step 22: After receiving the throughput test request data packet, the target vehicular communication unit returns a UDP data packet continuously, and persists for 4 s, where the UDP data packet includes a location of the target vehicle and driving status information.

Step 23: The roadside communication unit records UDP data packets received in every 1 s period, persists for three periods, and calculates a throughput (TP) of a unidirectional link from the target vehicular communication unit to the roadside communication unit according to a quantity of bytes of UDP data packets received in a second period, as shown in an equation (2):

$$TP = \frac{QBPR(S)}{PD}, \quad (2)$$

where QBPR(s) is defined as the quantity of bytes of UDP data packets received in the second period and the PD is defined as Period duration.

Calculating a round trip time RTT from the target vehicular communication unit to the roadside communication unit includes the following steps:

Step 24: The roadside communication unit sends an ICMPv6 data packet to the target vehicular communication unit at an interval of 0.1 s cyclically, persists for 3 s, and records a sending time sequence T_Send[i] of sending the ICMPv6 data packet, where i=1, 2, . . . , 30.

Step 25: After receiving the ICMPv6 data packet, the target vehicular communication unit returns an ICMPv6 response data packet.

Step 26: The roadside communication unit records a receiving time sequence T_Receive[j] of receiving the ICMPv6 response data packet from the target vehicular communication unit, where j=1, 2, . . . , 30.

Step 27: When the response data packet is unreachable or times out, set the corresponding sending time sequence T_Send[i] and the receiving time sequence T_Receive[j] to 0, where i=j, increase a failure count by 1, and calculate the round trip time RTT according to an equation (3), where $$RTT = \frac{\sum_{i=j=1}^{30} (T\_Receive[j] - T\_Send[i])}{30 - FC}. \quad (3)$$

A test process is as follows:

Step S110: Set an IP address of a host vehicular communication unit to 192.168.161.123, a port number for communicating with a software test program in a host vehicle to 22, and a port number for communicating with a target vehicular communication unit to 12000; set an IP address of the target vehicular communication unit to 192.168.161.124, and a port number for communicating with the host vehicular communication unit to 12000; connect the host vehicular communication unit to a notebook computer using a network cable, start the software test program in the host vehicle, and establish a communication connection to the host vehicular communication unit (192.168.161.123:22) using the SSH protocol; and set a name of a log file to "vehicle-vehicle 30 km/h".

Step S120: Drive both the host vehicle and the target vehicle around a test runway at a speed of 30 km/h for five circles, where the host vehicle is behind the target vehicle, the test runway is 2.4 km long, and a straight lane is a 1.1 km high-speed ring runway, and the host vehicle always keeps a safe trailing distance of 100-150 m from the target vehicle.

Step S130: After the host vehicle enters a southside straight lane, manually operate the software test program in the host vehicle to send a throughput test control command to the host vehicular communication unit.

Step S140: After the host vehicle enters a northside straight lane, manually operate the software test program in the host vehicle to send an RTT test control command to the host vehicular communication unit.

Step S150: In this case, the log file "vehicle-vehicle 30 km/h" should include five throughput test results and five round trip time RTT test results. Perform averaging to obtain an average throughput and an average round trip time RTT respectively, calculate a network performance parameter η using the equation (3), and evaluate network performance.

Step S210: Set an IP address of a roadside communication unit to 192.168.161.120, a port number for communicating with a roadside software test program to 22, and a port number for communicating with a target vehicular communication unit to 12000; set an IP address of the target vehicular communication unit to 192.168.161.124, and a port number for communicating with the roadside communication unit to 12000; connect the roadside communication unit to a notebook computer using a network cable, start the roadside software test program, and establish a communication connection to the roadside communication unit (192.168.161.120:22) using the SSH protocol; and set a name of a log file to "vehicle-roadside 30 km/h".

Step S220: Drive the target vehicle back and forth on a test road segment at a speed of 30 km/h for five times, where one round trip is counted as one time, the test road segment is a 400 m straight lane, and the roadside communication unit and the notebook computer are arranged in roadside positions in a center of the straight lane.

Step S230: When the target vehicle runs through the test road segment from west to east, manually operate the roadside software test program to send a throughput test control command to the roadside communication unit.

Step S240: When the target vehicle runs through the test road segment from east to west, manually operate the roadside software test program to send an RTT test control command to the roadside communication unit.

Step S250: In this case, the log file "vehicle-roadside 30 km/h" should include five throughput test results and five round trip time RTT test results. Perform averaging to obtain an average throughput and an average round trip time RTT respectively, calculate a network performance parameter η using the equation (3), and evaluate network performance.

The foregoing are preferred embodiments of the present invention. It should be understood that, the foregoing are merely some specific embodiments and are not intended to limit the protection scope of the present invention. Any modification, equivalent replacement, and improvement made without departing from the spirit and scope of the present invention shall within the protection scope of the present invention.

What is claimed is:

1. An IEEE 802.11p protocol-based vehicle-to-vehicle communication test method oriented to the Internet of Vehicles, comprising the following steps:
    step 1: randomly selecting two vehicles, wherein one vehicle is a host vehicle, the other vehicle is a target vehicle, the host vehicle and the target vehicle are driven at a same speed per hour on a road segment L, the host vehicle is located behind the target vehicle, a constant distance is maintained between the host vehicle and the target vehicle, the host vehicle is equipped with a host vehicular communication unit, the target vehicle is equipped with a target vehicular communication unit, and the host vehicular communication unit and the target vehicular communication unit are capable of communicating with each other using the vehicular communication units;
    step 2: calculating a throughput and a round trip time RTT from the target vehicular communication unit to the host vehicular communication unit;
    step 3: driving the host vehicle and the target vehicle on the road segment L for N times, and calculating an average throughput and an average round trip time RTT of the N times; and
    step 4: calculating a network performance parameter η using an equation (1) according to the average throughput and the average round trip time RTT that are obtained through calculation in the foregoing step:

$$\eta = \frac{AT}{800 \text{ KBps}} \times 0.35 + \frac{10 \text{ ms}}{RTT} \times 0.65; \quad (1)$$

and if η≥0.9, considering that IEEE 802.11p protocol-based wireless network performance of the Internet of Vehicles is excellent;

if 0.75≤η<0.9, considering that IEEE 802.11p protocol-based wireless network performance of the Internet of Vehicles is good;

if 0.6≤η<0.75, considering that IEEE 802.11p protocol-based wireless network performance of the Internet of Vehicles is moderate; or if η<0.6, considering that IEEE 802.11p protocol-based wireless network performance of the Internet of Vehicles is poor.

2. The IEEE 802.11p protocol-based vehicle-to-vehicle communication test method oriented to the Internet of Vehicles according to claim 1, wherein calculating an average throughput from the target vehicular communication unit to the host vehicular communication unit comprises:

step 21: sending, by the host vehicular communication unit, a throughput test request data packet to the target vehicular communication unit, and starting a timer with 1 s as a period;

step 22: after receiving the throughput test request data packet, returning, by the target vehicular communication unit, a UDP data packet continuously, and persisting for 4 s, wherein the UDP data packet comprises a location of the target vehicle and driving status information; and step 23: recording, by the host vehicular communication unit, UDP data packets received in every 1 s period, persisting for three periods, and calculating a throughput of a unidirectional link from the target vehicular communication unit to the host vehicular communication unit according to a quantity of bytes of UDP data packets received in a second period.

3. The IEEE 802.11p protocol-based vehicle-to-vehicle communication test method oriented to the Internet of Vehicles according to claim 1, wherein calculating a round trip time RTT from the target vehicular communication unit to the host vehicular communication unit comprises:

step 24: sending, by the host vehicular communication unit, an ICMPv6 data packet to the target vehicular communication unit at an interval of 0.1 s cyclically, persisting for 3 s, and recording a sending time sequence T_Send[i] of sending the ICMPv6 data packet, wherein i=1, 2, . . . , 30;

step 25: after receiving the ICMPv6 data packet, returning, by the target vehicular communication unit, an ICMPv6 response data packet;

step 26: recording, by the host vehicular communication unit, a receiving time sequence T_Receive[j] of receiving the ICMPv6 response data packet from the target vehicular communication unit, where j=1, 2, . . . , 30; and step 27: when the response data packet is unreachable or times out, setting the corresponding sending time sequence T_Send[i] and the receiving time sequence T_Receive[j] to 0, wherein i=j, increasing a failure count by 1, and calculating the round trip time RTT according to an equation (3), wherein $$RTT = \frac{\sum_{i=j=1}^{30} (T\_Receive[j] - T\_Send[i])}{30 - FC}. \quad (3)$$

4. The IEEE 802.11p protocol-based vehicle-to-vehicle communication test method oriented to the Internet of Vehicles according to claim 1, wherein the road segment L is a ring road segment.

5. An IEEE 802.11p protocol-based vehicle-to-roadside communication test method oriented to the Internet of Vehicles, comprising the following steps:

step 1: randomly selecting a vehicle as a target vehicle, and driving the target vehicle on a road segment L, wherein a roadside communication unit is disposed near the road segment L, the target vehicle is equipped with a target vehicular communication unit, and the roadside communication unit and the target vehicular communication unit are capable of communicating with each other using a vehicular communication unit;

step 2: calculating a throughput and a round trip time RTT from the target vehicular communication unit to the roadside communication unit; and Step 3: driving the target vehicle on the road segment L for N times, and calculating an average throughput and an average round trip time RTT of the N times; wherein $$\eta = \frac{AT}{800 \text{ KBps}} \times 0.35 + \frac{10 \text{ ms}}{RTT} \times 0.65. \quad (1)$$

6. The IEEE 802.11p protocol-based vehicle-to-roadside communication test method oriented to the Internet of Vehicles according to claim 5, wherein calculating an average throughput from the target vehicular communication unit to the roadside communication unit comprises:

step 21: sending, by the roadside communication unit, a throughput test request data packet to the target vehicular communication unit, and starting a timer with 1 s as a period; and step 23: recording, by the roadside communication unit, UDP data packets received in every 1 s period, persisting for three periods, and calculating a throughput of a unidirectional link from the target vehicular communication unit to the roadside communication unit according to a quantity of bytes of UDP data packets received in a second period.

7. The IEEE 802.11p protocol-based vehicle-to-roadside communication test method oriented to the Internet of Vehicles according to claim 5, wherein calculating a round trip time RTT from the target vehicular communication unit to the roadside communication unit comprises:

step 24: sending, by the roadside communication unit, an ICMPv6 data packet to the target vehicular communication unit at an interval of 0.1 s cyclically, persisting for 3 s, and recording a sending time sequence T_Send[i] of sending the ICMPv6 data packet, wherein i=1, 2, . . . , 30; and step 26: recording, by the roadside communication unit, a receiving time sequence T_Receive[j] of receiving an ICMPv6 response data packet from the target vehicular communication unit, wherein j=1, 2, . . . , 30; wherein $$RTT = \frac{\sum_{i=j=1}^{30} (T\_Receive[j] - T\_Send[i])}{30 - FC}. \quad (3)$$

8. The IEEE 802.11p protocol-based vehicle-to-roadside communication test method oriented to the Internet of Vehicles according to claim 5, wherein the road segment L is a straight road segment.

* * * * *